United States Patent
Tuynman et al.

(10) Patent No.: US 10,794,064 B2
(45) Date of Patent: Oct. 6, 2020

(54) SEAL AND GAPS AND JOINTS SEALING METHOD

(71) Applicants: Jehbco Manufacturing Pty Ltd, Brookvale NSW (AU); Janice Tuynman, Newport Beach (AU)

(72) Inventors: Hendrik Tuynman, Brookvale (AU); Karel Tuynman, Brookvale (AU); Amirhossein Asadabadi, Brookvale (AU)

(73) Assignee: Jehbco Manufacturing Pty Ltd, Brookvale NSW (AU)

(*) Notice: Subject to any disclaimer, the term of this patent is extended or adjusted under 35 U.S.C. 154(b) by 0 days.

(21) Appl. No.: 15/450,336

(22) Filed: Mar. 6, 2017

(65) Prior Publication Data
US 2018/0251971 A1 Sep. 6, 2018

(51) Int. Cl.
| E04F 13/08 | (2006.01) |
| F16J 15/02 | (2006.01) |
| F16J 15/06 | (2006.01) |

(52) U.S. Cl.
CPC ......... E04F 13/0898 (2013.01); F16J 15/025 (2013.01); F16J 15/027 (2013.01); F16J 15/061 (2013.01)

(58) Field of Classification Search
CPC ... E04B 1/6813; E04F 13/0898; F16J 15/027; F16J 15/025; F16J 15/0893; B60J 10/22
See application file for complete search history.

(56) References Cited

U.S. PATENT DOCUMENTS

| 2,156,681 A * | 5/1939 | Dewhirst | E01C 11/106 277/649 |
| 2,228,052 A * | 1/1941 | Gardner | E01C 11/106 404/64 |
| 2,230,303 A * | 2/1941 | Leguillon | E01C 11/106 277/645 |
| 2,230,688 A * | 2/1941 | Irwin | E01C 11/106 16/7 |
| 2,910,209 A * | 10/1959 | Nelson | A61G 17/02 220/378 |
| 2,986,848 A * | 6/1961 | Greene | E04B 1/6813 52/396.05 |
| 3,286,425 A * | 11/1966 | Brown | E04B 1/6815 404/64 |
| 3,687,022 A * | 8/1972 | Brown | E01D 19/06 277/645 |
| 3,709,115 A * | 1/1973 | Brown | E01C 11/106 404/65 |
| 5,531,455 A * | 7/1996 | Calixto | E02D 29/16 277/637 |
| 5,687,976 A * | 11/1997 | Andrick | F16J 15/027 277/605 |

(Continued)

Primary Examiner — Eugene G Byrd
(74) Attorney, Agent, or Firm — Alston & Bird LLP (57) ABSTRACT

The present invention relates to a resilient seal for sealing one or more gaps or joints. The seal includes an elongate strip having first and second portions. The first portion is configured in use to engage one or more internal surfaces defining the gaps or joints. The second portion is configured to substantially conform to the shape and configuration of the one or more gaps or joints so as to substantially fill the one or more gaps or joints when in use. The invention also relates to a method of sealing one or more gaps or joints using the resilient seal.

23 Claims, 6 Drawing Sheets

(56) References Cited

U.S. PATENT DOCUMENTS

| | | | | |
|---|---|---|---|---|
| 7,090,226 B1* | 8/2006 | Trainor | .............. | E06B 3/6202 |
| | | | | 277/630 |
| 8,683,773 B2* | 4/2014 | Emmons | ............ | E04G 23/0203 |
| | | | | 52/2.13 |
| 9,322,163 B1* | 4/2016 | Hensley | ................ | E04B 1/6813 |
| 9,359,761 B2* | 6/2016 | Scurto | ..................... | E04B 5/32 |
| 2007/0077123 A1* | 4/2007 | Williams | ................. | E02B 3/16 |
| | | | | 405/107 |
| 2008/0190055 A1* | 8/2008 | Schmid | ............... | E04B 1/6807 |
| | | | | 52/259 |
| 2008/0307733 A1* | 12/2008 | Rice | .................... | E04B 1/6813 |
| | | | | 52/396.02 |
| 2009/0079141 A1* | 3/2009 | Qiang | ................... | F16J 15/027 |
| | | | | 277/650 |
| 2010/0095620 A1* | 4/2010 | Wilkes, Jr. | ........... | E04B 1/6812 |
| | | | | 52/396.04 |
| 2012/0153578 A1* | 6/2012 | Douglass, III | ........ | F16J 15/027 |
| | | | | 277/627 |
| 2013/0202348 A1* | 8/2013 | Jensen | .................. | E04B 1/681 |
| | | | | 403/288 |
| 2013/0264773 A1* | 10/2013 | McDowell | .............. | F16J 15/10 |
| | | | | 277/312 |
| 2014/0241787 A1* | 8/2014 | Campbell | ............ | C08G 18/76 |
| | | | | 403/28 |
| 2015/0042047 A1* | 2/2015 | Winslow | ............... | F16J 15/022 |
| | | | | 277/637 |

* cited by examiner

SEAL AND GAPS AND JOINTS SEALING METHOD

The present invention generally relates to seals. More particularly, the present invention relates to seals for use in façade gaps and expansion joints. The present invention also relates to a method of sealing façade gaps and expansion joints.

BACKGROUND

External cladding systems are commonly used for contemporary new and refurbishment building projects. One of the most popular and versatile cladding systems is generally referred to as a cassette panel system suitable for application on low to high rise buildings. In such a system, multiple cassettes are bent and fixed with invisible clips to a framework which is secured to the load bearing structure. It offers a façade solution that provides a modern appearance. Typically, the cassettes are installed onto a load bearing structure with staggered angle clips creating gaps and joints between adjacent cassettes. These gaps and joints are conventionally sealed with liquid sealants such as caulk in order to stop water penetration and form a smooth surface. Such a wet-seal system requires a 'backing rod filling technique' relying on the set liquid sealant as a defence against water and moisture penetration. This wet-seal system has at least the following shortcomings: (i) it is time-consuming and costly to apply; (ii) it is cumbersome to apply and may not function well when the gaps are too wide; (iii) it may have problems relating to bubbling and unevenness of the surface of the seal which are aesthetically unpleasant; (iv) the seal may bulge out of the surface as a result of the expanding and shrinking of the gap due to change of weather; (v) it unavoidably involves wastage which incurs disposal and transportation costs of cartridges; and/or (vi) it is susceptible to hot weather—when poured into an expansion joint, the wet silicone boils leading to both aesthetic and performance issues.

It is an object of the present invention to provide a seal and a gap or joint sealing method which may ameliorate the abovementioned shortcoming or which will at least provide the public with a useful choice.

BRIEF SUMMARY

According to one aspect of the present invention, there is provided a resilient seal for sealing one or more gaps or joints, the seal including an elongate strip having first and second portions, the first portion adapted in use to engage one or more internal surfaces defining the gaps or joints, the second portion being adapted to substantially conform to the shape and configuration of the or each gap or joint so as to substantially fill the or each gap or joint when in use.

In an exemplary embodiment, the resilient seal includes a hollow running longitudinally along the length of the strip. In certain embodiments, the hollow is located at least partially in the second portion of the elongate strip. In certain embodiments, the hollow is positioned, shaped and configured so as to facilitate elastic deformation of part or all of the second portion as it enters the or each gap or joint.

In an exemplary embodiment, the hollow is at least defined by two side walls forming part of the second portion. During installation, when subjected to external compressing or squeezing forces, the side walls are advantageously configured to collapse inwardly so as to facilitate placement of the elongate strip into the or each gap. The hollow has a cross section which may be substantially cylindrical, trapezoidal or irregular in shape.

In certain embodiments, the first portion has a width that is smaller than that of an opening of the (or each) gap or joint. As such, once forced into place within the (or each) gap or joint, the first portion naturally urges onto the internal surfaces of the (or each) gap or joint thereby providing a tight seal. In certain embodiments, the first portion includes one or more extensions adapted to ensure a smooth and continuous transition.

In certain embodiments, the one or more extensions when in use are located at or near an opening of the (or each) gap or joint. In certain embodiments, the first portion is flanked by a pair of extensions, each extension being in the form of a flange. The extensions are advantageously to be configured so as to seamlessly conceal the (or each) gap or joint.

In certain embodiments, the second portion includes gripping means. The gripping means may include one or more elements of the second portion. In at least one embodiment, the (or each) element is prominent in shape including an obtuse corner, an acute corner, a pointy end and a flange. In one embodiment, the gripping means include one or more pairs of flanges. In still other embodiments, the second portion is flanked by three pairs of flanges extending outwardly from the two side walls of the second portion and being adapted to engage the internal surfaces of the or each gap or joint. In yet other embodiments, each flange is disposed at an inclined angle to the corresponding side wall so as to facilitate entrance into the corresponding gap or joint during installation.

Optionally, the resilient seal includes one or more branches. Each branch may extend laterally or in any other chosen direction. In certain embodiments, the resilient seal includes two branches extending laterally from the elongate strip thereby forming a cross-shaped cross section. In at least one embodiment, each branch includes an elongate hollow which may or may not be in communication with the hollow of the elongate strip.

In another embodiment, the strip is solid having a U-shaped cross section.

In certain embodiments, the seal is made of a resilient material. In other embodiments, the resilient material is silicone.

In certain embodiments, the elongate strip is an extrusion.

In certain embodiments, the joints include expansion joints.

According to another aspect of the present invention, there is provided a method of sealing one or more gaps or joints, the method including the steps of: (a) providing a resilient seal adapted to fill the or each gap or joint; (b) aligning the resilient seal with the or each gap or joint; and (c) pushing or forcing the resilient seal into the or each gap or joint.

In certain embodiments, the method includes an initial step of applying a layer of adhesive onto at least part of the internal surfaces of the (or each) gap or joint.

In certain embodiments, the or each seal includes an elongate strip having first and second portions, the first portion having one or more extensions adapted in use to engage one or more internal surfaces defining the gaps or joints, the second portion being adapted to substantially conform to the shape and configuration of the or each gap or joint so as to substantially fill the or each gap or joint when in use.

The resilient seal may be forced into the (or each) gap or joint by utilising a roller.

The resilient seal is beneficially made of silicone.

BRIEF DESCRIPTION OF SEVERAL VIEWS OF THE DRAWINGS

The invention in its various aspects will now be described in connection with non-limiting embodiments illustrated in the accompanying drawings. It will be appreciated that the drawings are not all shown on the same scale.

DETAILED DESCRIPTION OF VARIOUS EMBODIMENTS

It should be noted that the resilient seals described herein are intended to be applied to fill cassette façade gaps or expansion joints for example. It will however be appreciated that the resilient seals may be used to fill gaps or joints (eg. expansion joints) created by other building materials such as windows and glazing or even concrete. Various embodiments of resilient seals of the present invention are herein described to be applied to fill cassette façade gaps for exemplary purposes. Also, the seals of the present invention are made of a resilient material such as silicone by way of solid extrusion. Furthermore, the elongate strip of each seal is manufactured by extrusion.

Figure 1:
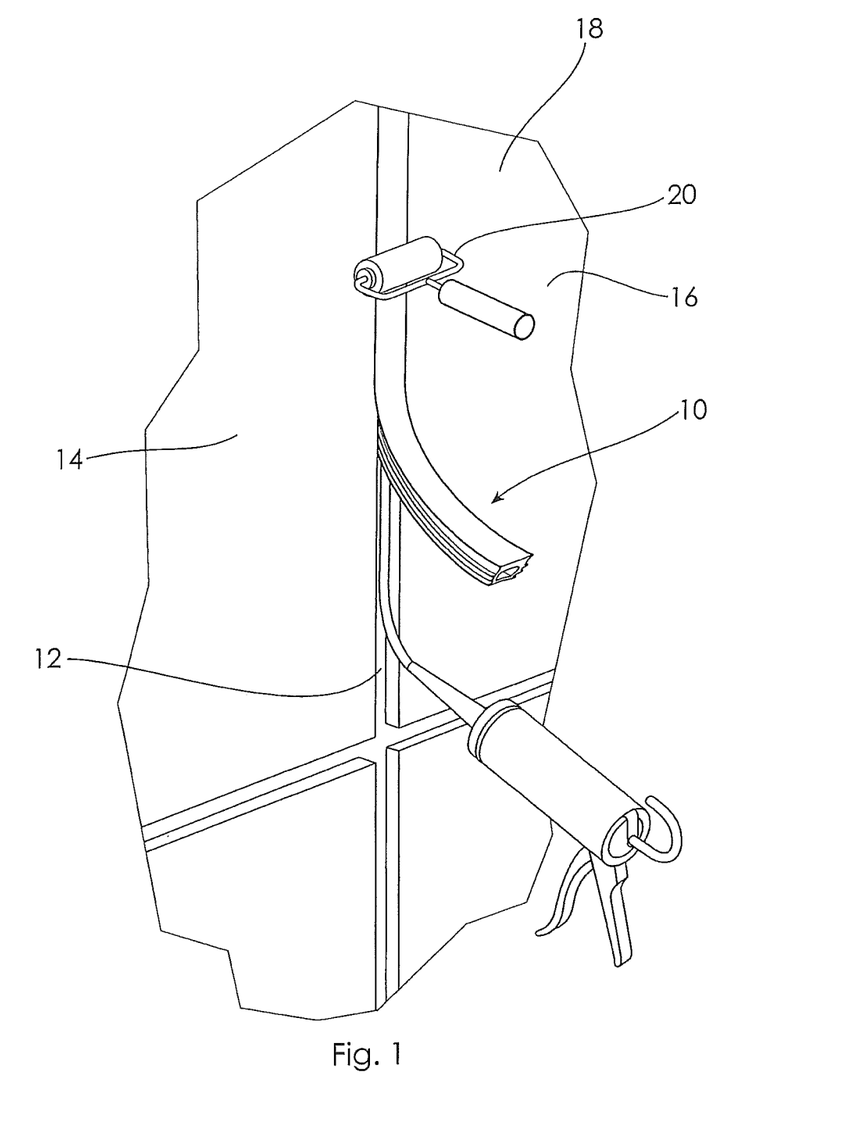
FIG. 1 is a perspective view of a first embodiment of the resilient seal being installed into a gap between cassettes of a façade of a building.
Figure 2:
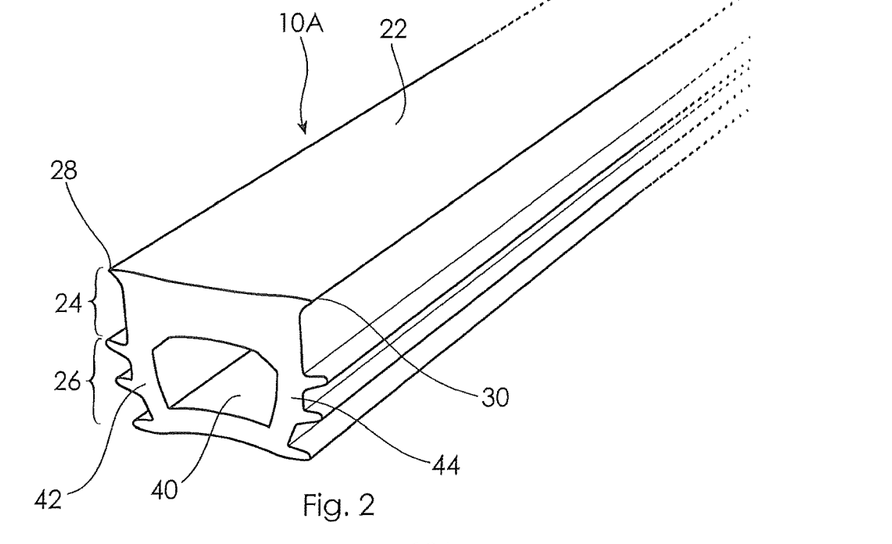
FIG. 2 is a perspective view of the seal of FIG. 1.
Figure 3:
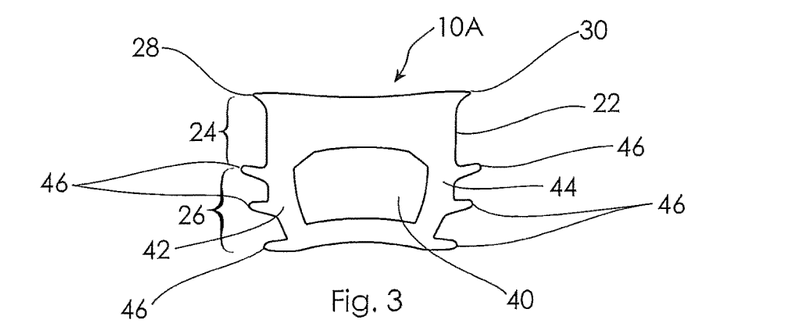
FIG. 3 is an end view of the seal of FIG. 1.
Figure 4:
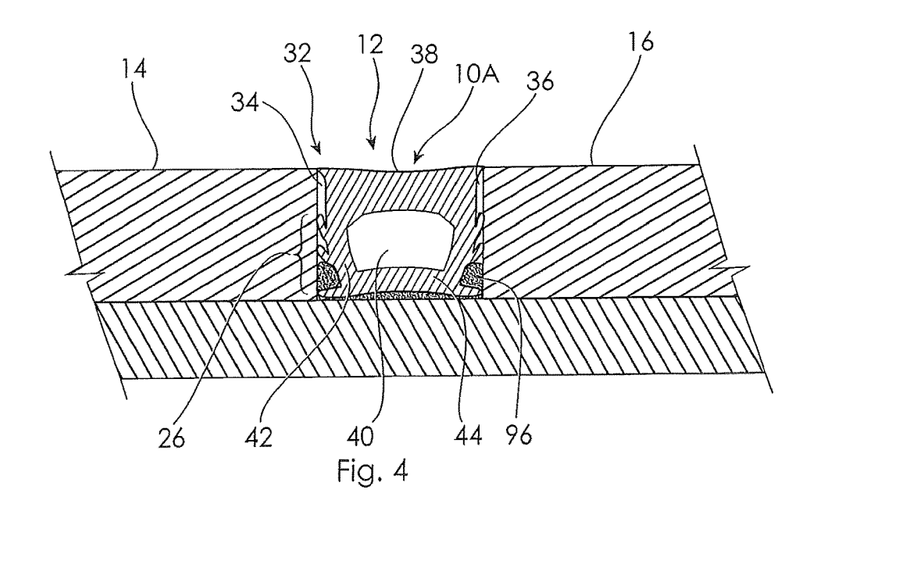
FIG. 4 is a cross-sectional view of the seal of FIG. 1 after installation into a gap.

Referring to FIGS. 1 and 4, a resilient seal 10A is shown being applied by way of a roller 20 to fill a gap 12 between cassettes 14 & 16 of a façade 18 of a building. As shown in FIGS. 2 to 4, the resilient seal has an elongate strip 22 having first (front) and (rear) second portions 24 & 26. The first portion 24 has a width that is smaller than that of an opening of the gap 12. As such, once forced into place within the gap 12, the first portion 24 naturally urges onto internal surfaces 34 & 36 of the gap 12 thereby providing a tight seal.

Also, the first portion 24 is flanked by extensions which are in the form of a pair of flanges 28 & 30. The extensions function to ensure a smooth and continuous transition from the cassettes 14 & 16 to the seal 10A.

As best shown in FIG. 4, once the seal 10A is installed, the flanges 28 & 30 are located at or near an opening 32 of the gap 12. The flanges 28 and 30 in use are in tight engagement with the respective internal surfaces 34 & 36 which partially define the gap 12 and a waterproofing seal is achieved as a result. The exposed surface 38 is flush with faces of the cassettes 14 & 16. As such, the flanges 28 & 30 are effective in seamlessly concealing the gap 12. The second portion 26 is configured to substantially conform to the shape and configuration of the gap 12. As such, the second portion 26 is snugly received within the gap 12 thereby substantially filling up space defined by the internal surfaces 34 & 36.

Referring to 2 to 4, the resilient seal 10A has a hollow 40 running longitudinally along the length of the strip 22. In the present embodiment, the hollow 40 is located in the second portion 26 of the elongate strip 22 being defined by two side walls 42 & 44 which form part of the second portion 26. The hollow 40 is positioned, shaped and configured so as to facilitate elastic deformation of at least the side walls 42 & 44 of the second portion 26 as it enters the gap 12. During installation, when subjected to external compressing or squeezing forces, the side walls 42 & 44 are designed to resiliently collapse inwardly in order to facilitate placement of the elongate strip 22 into the gap 12. In the present embodiment, the cross section of the hollow 40 is in the shape of a wonky trapezium.

The second portion 26 of the elongate strip 22 has gripping means being one or more elements of the second portion 26. In a general sense, each element is prominent in shape including an obtuse corner, an acute corner, a pointy end and a flange. In the present embodiment, the second portion is flanked by gripping means being three pairs of flanges 46 extending outwardly from the two side walls 42 & 44 of the second portion 26. The flanges 46 are configured to engage the rear end of internal surfaces 34 & 36 of the gap 12. As best shown in FIG. 3, each of the flanges 46 is disposed at an inclined angle to the corresponding side wall 42, 44 so as to facilitate entrance into the gap 12 during installation.

Figure 5:
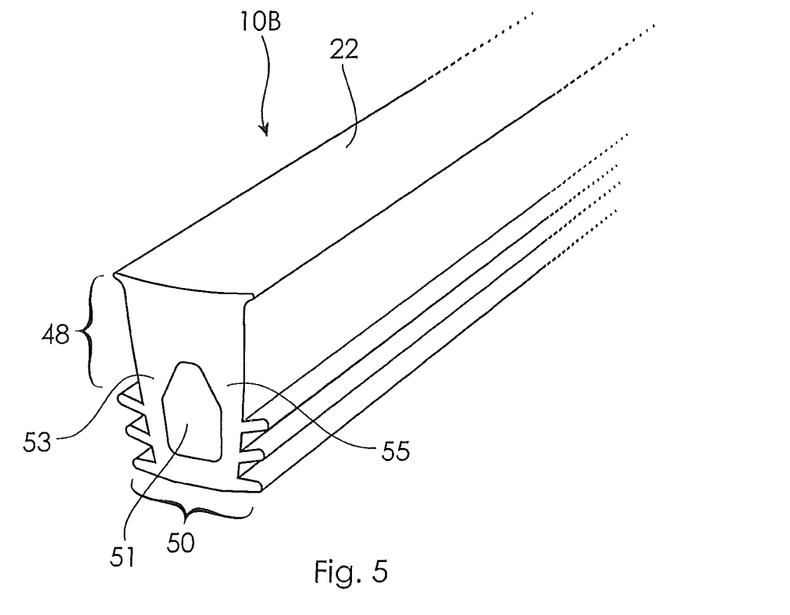
FIG. 5 is a perspective view of a second embodiment of the resilient seal.
Figure 6:
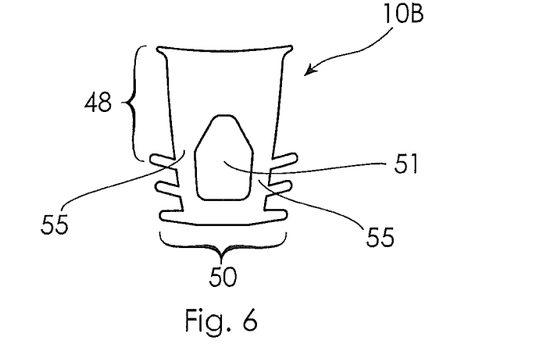
FIG. 6 is an end view of the seal of FIG. 5.
Figure 7:
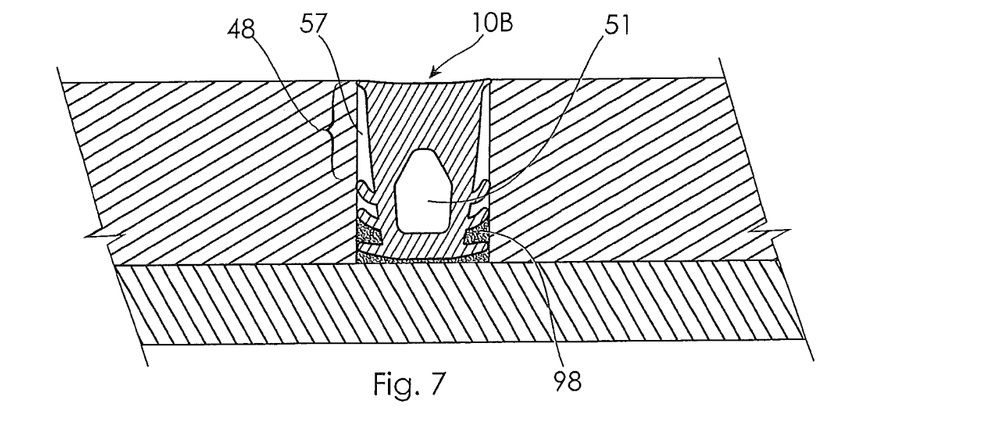
FIG. 7 is a cross-sectional view of the seal of FIG. 5 after installation into a gap.

Turning to FIGS. 5 to 7, another embodiment of the resilient seal 10B is shown. Seal 10B is similar to seal 10A in terms of their shape and configuration, except that seal 10B has a relatively taller first portion 48 and a narrower overall width 50. Seal 10B is shown to illustrate that seals of a similar shape and configuration may be made in different dimensions to suit different gaps. Seal 10B also has a symmetrical hollow 51 partially defined by side walls 53 & 55 which are configured to cover the depth of the gap 57. The hollow 51 has a cross section with a square base and a tapering top.

Figure 8:
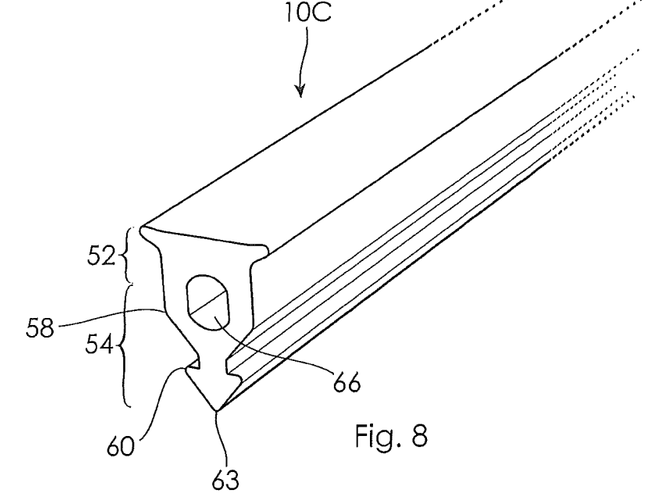
FIG. 8 a perspective view of a third embodiment of the resilient seal.
Figure 9:
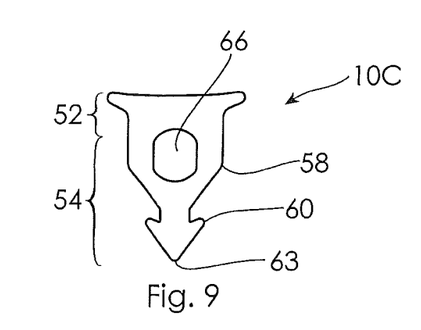
FIG. 9 is an end view of the seal of FIG. 8.
Figure 10:
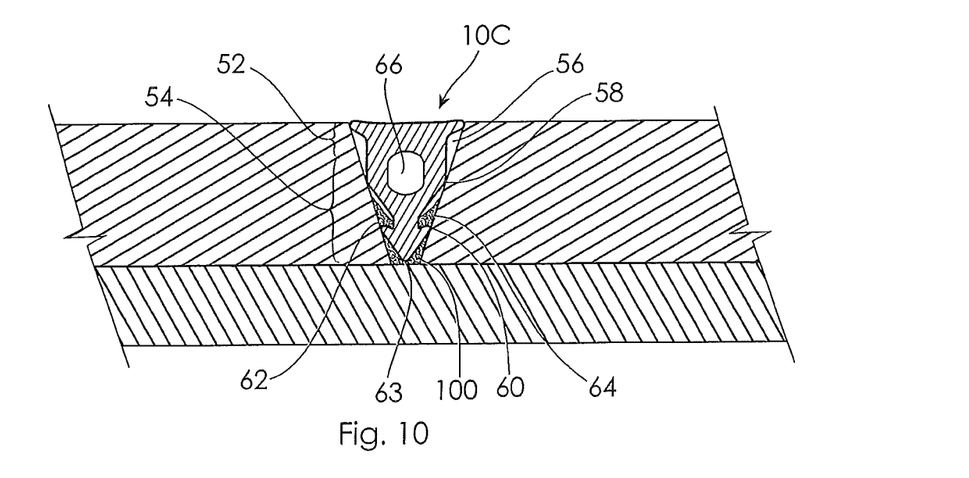
FIG. 10 is a cross-sectional view of the seal of FIG. 8 after installation into a gap.

Referring to FIGS. 8 to 10, a further embodiment of the resilient seal 10C is shown. The seal 10C is shaped and configured to conform to the substantially triangular shape of the gap 56 (see FIG. 10). Seal 10C has a rather shallow first portion 52 and a second portion 54 which is in the shape of a wonky arrow. In this embodiment, the second portion 54 has gripping means that are in the form of an obtuse corner 58, an acute corner 60 and a pointy end 62. As shown in FIG. 10, each of these gripping means are in use in firm engagement with slanting internal surfaces 62 & 64 of the gap 56. Also, the seal 10C has a hollow 66 with an oblong-shaped cross section.

Figure 11:
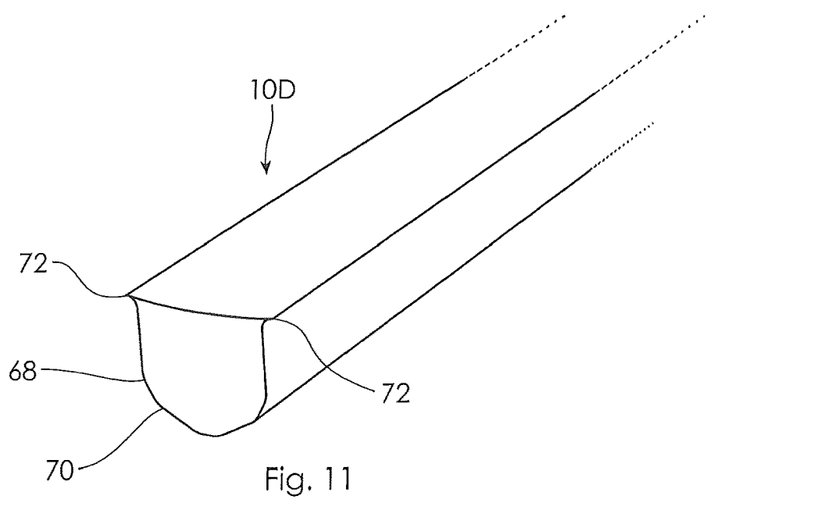
FIG. 11 is a perspective view of a fourth embodiment of the resilient seal.
Figure 12:
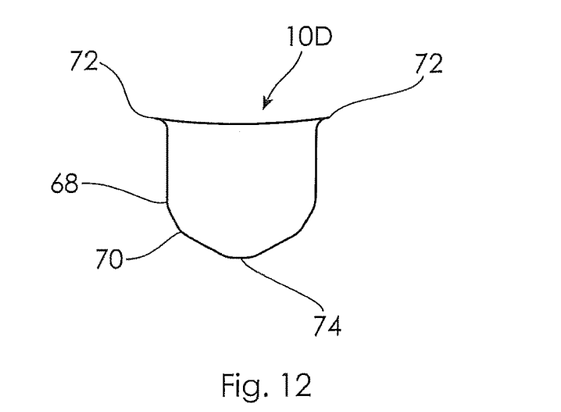
FIG. 12 is an end view of the seal of FIG. 11.
Figure 13:
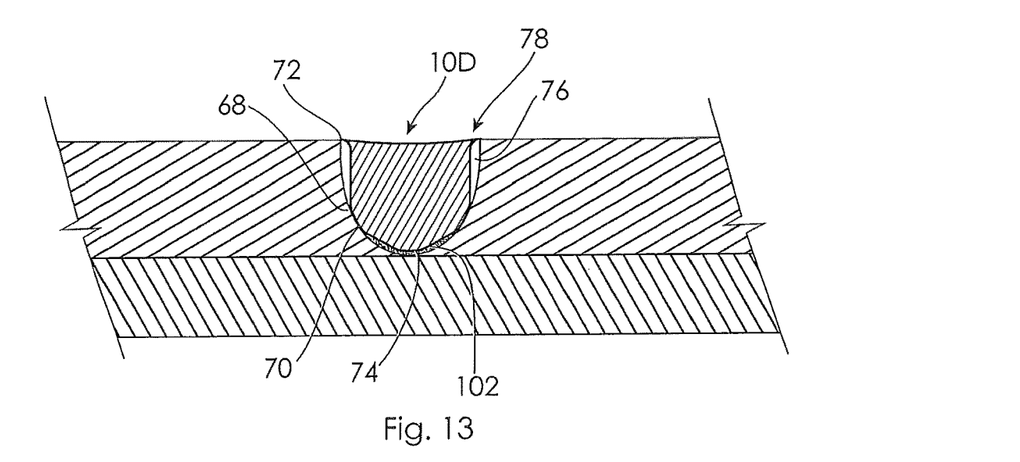
FIG. 13 is a cross-sectional view of the seal of FIG. 11 after installation into a gap.

As shown in FIGS. 11 to 13, a yet further embodiment of the seal 10D is shown. Seal 10D has a solid elongate strip with a U-shaped cross section. Seal 10D has a first portion with extensions in the form of flanges 72 and a second portion having gripping means in the form of obtuse corners 68 & 70 and a relatively blunt end 74. Referring to FIG. 13, after installation, the obtuse corners 68 & 70 and blunt end 74 are in firm contact with the internal surface 76 of the gap 78.

Figure 14:
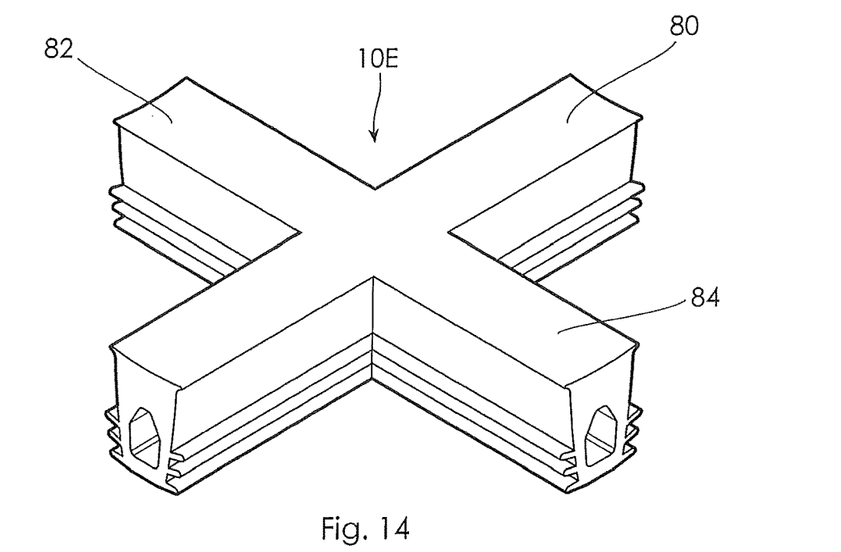
FIG. 14 is a perspective view of a fifth embodiment of the resilient seal.
Figure 15:
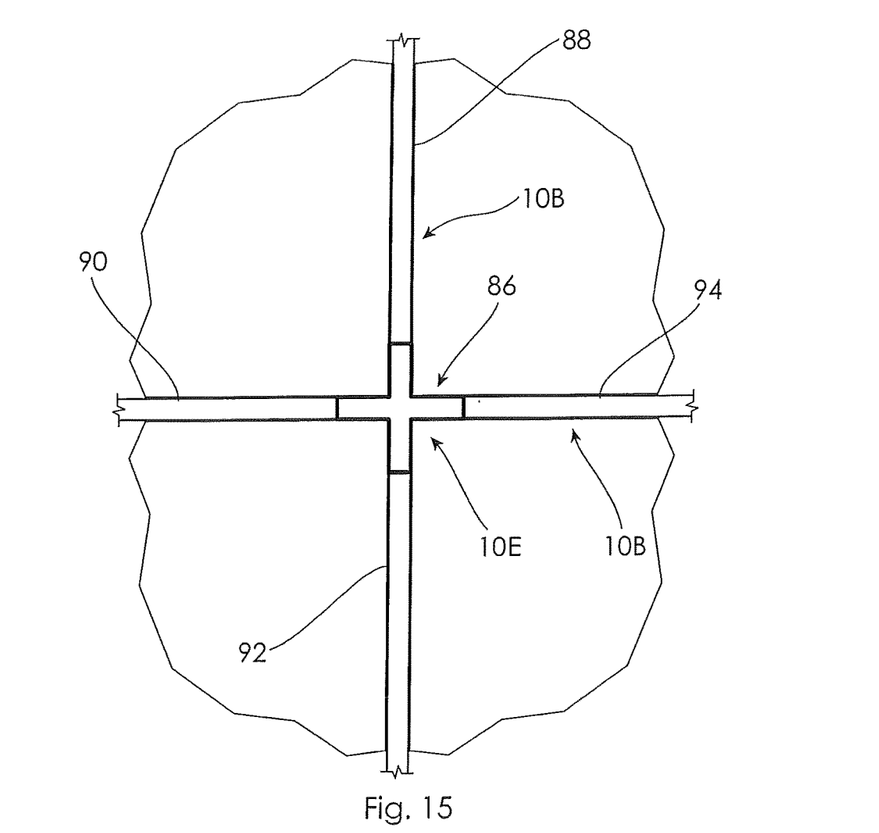
FIG. 15 is a plan view of the seal of FIG. 14 installed in a four-way joint.

Turning to FIGS. 14 and 15, a yet further embodiment of the seal 10E is shown. In additional to the elongate strip 80, Seal 10E has two branches 82 & 84 extending laterally thereby forming a cross-shaped cross section. Seal 10E is configured to be applied to a four-way joint such as that shown in FIG. 15. The reminder of each of the elongate gaps 88, 90, 92 & 94 is filled and sealed with seal 10B. It is contemplated that in other embodiments, each branch may extend in any other chosen directions. Also, each branch may have an elongate hollow which may or may not be in communication with the hollow of the elongate strip 80 for example.

Referring to FIG. 1, the method of sealing a cassette façade gap 12 is now described. The method includes the initial step of applying a layer of adhesive such as wet silicone onto at least part of the internal surfaces of the gap 12. It is however contemplated that this step is optional in that the seals of the present invention would still function well without any wet adhesive. A resilient seal 10A adapted to fill the gap 12 is then provided and aligned with the gap 12. The seal 10A is then pushed into the gap 12 and firmly forced into the gap 12 by way of a tool such as roller 20.

Now that various beneficial embodiments of the present invention have been described in some detail, it will be apparent to a skilled person in the art that the seals of the present invention may offer at least the following advantages: (i) easy to apply, handle and install; (ii) it is unaffected by the ambient temperature; (iii) it enables full control over the shape of the seal profile thereby minimizing wastage; (iv) it's appearance after installation is not dependent on the skill and experience of the user during application; (v) it offers the user control throughout the application or installation process; (vi) it offers consistency in terms of appearance after installation; (vii) it offers longevity in terms of life expectancy; and/or (viii) it can be made in different colours as desired to match different neighbouring materials or structure.

Those skilled in the art will appreciate that the invention described herein is susceptible to variations and modifications other than those specifically described. For instance, elongate strips in other shapes and configurations may be created to suit gaps of different sizes and configurations. Also, the hollow may be provided in different shapes and configurations depending on the size and configuration of the opening of a gap. Furthermore, the seals of the present invention may be manufactured by other methods. All such variations and modifications are to be considered within the scope and spirit of the present invention the nature of which is to be determined from the foregoing description.

The invention claimed is:

1. A resilient seal for sealing one or more gaps or joints, the seal comprising:
    an elongate strip having a first portion and a second portion integrally formed with the first portion, the second portion having two opposing side walls each having a longitudinal axis extending away from the first portion, the second portion having a bottom wall extending between and connecting a distal end of each of the two opposing side walls,
    a hollow running longitudinally along the length of the strip and located at least partially in the second portion of the elongate strip, and
    a pair of opposing extensions located at an exposed surface of the first portion, wherein:
    the pair of opposing extensions define a width of the exposed surface that is greater than a width of the first portion lacking the pair of opposing extensions,
    the exposed surface of the first portion is spaced apart from the second portion and is configured, based in part upon the pair of opposing extensions, to provide a flush surface relative to a top of the gaps or joints,
    the first portion is configured, in use, to engage one or more internal surfaces defining the gaps or joints,
    the second portion is configured to substantially conform to the shape and configuration of the or each gap or joint so as to, in use, substantially fill the or each gap or joint;
    the second portion is flanked by at least one pair of flanges extending outwardly from the two opposing side walls of the second portion, each flange of the at least one pair of flanges having a longitudinal axis extending at an acute angle relative to the longitudinal wall axis of the second portion such that each flange is configured to engage the internal surfaces of the gaps or joints;
    the bottom wall has at least one exterior-facing concave surface extending between the distal end of each of the two opposing side walls; and
    the hollow is defined by:
        a concave upper surface positioned between the first portion and an uppermost of the at least one pair of flanges of the second portion,
        a convex lower surface extending substantially parallel with the concave upper surface and being defined by a portion of the bottom wall,
        a pair of chamfered surfaces extending at an acute angle relative to and from opposing ends of the concave upper surface, and
        a pair of side surfaces extending from the pair of chamfered surfaces to the convex lower surface, the pair of side surfaces of the hollow being defined by an interior-facing surface of the two opposing side walls of the second portion.

2. The resilient seal of claim 1, wherein the hollow is positioned, shaped and configured so as to facilitate elastic deformation of part or all of the second portion as it enters the one or more gaps or joints.

3. The resilient seal of claim 1, wherein, when subjected to external compressing or squeezing forces, the side walls are configured to collapse inwardly so as to facilitate placement of the elongate strip into the or each gap during installation.

4. The resilient seal of claim 1, wherein the hollow has a cross section that is at least one of substantially cylindrical, trapezoidal or irregular in shape.

5. The resilient seal of claim 1, wherein the first portion has a width that is smaller than that of an opening of the one or more gaps or joints.

6. The resilient seal of claim 1, wherein the one or more extensions when in use are located at or near an opening of the one or more gaps or joints.

7. The resilient seal of claim 1, wherein the pair of opposing extensions each comprise an outwardly extending flange.

8. The resilient seal of claim 1, wherein the pair of opposing extensions are configured so as to seamlessly conceal the one or more gaps or joints.

9. The resilient seal of claim 1, wherein the at least one pair of flanges are prominent in shape comprising an obtuse corner, an acute corner, and a pointy end.

10. The resilient seal of claim 1, wherein the at least one pair of flanges comprises at least two pairs of flanges.

11. The resilient seal of claim 1, wherein the at least one pair of flanges comprises three pairs of flanges extending outwardly from the two side walls of the second portion and being configured to engage the internal surfaces of the or each gap or joint.

12. The resilient seal of claim 11, wherein each flange in the three pairs of flanges flanking the second portion is disposed at an inclined angle to the corresponding side wall so as to facilitate entrance into the corresponding gap or joint during installation.

13. The resilient seal of claim 1, further comprising one or more branches.

14. The resilient seal of claim 13, wherein each of the one or more branches extends laterally or in any other chosen direction.

15. The resilient seal of claim 1, wherein the resilient seal comprises two branches extending laterally from the elongate strip thereby forming a cross-shaped cross section.

16. The resilient seal of claim 13, wherein each of the one or more branches includes an elongate hollow in communication with the hollow of the elongate strip.

17. The resilient seal of claim 1, wherein the strip is solid and has a U-shaped cross section.

18. The resilient seal of claim 1, wherein the seal is made of silicone.

19. The resilient seal of claim 1, wherein the elongate strip is an extrusion.

20. The resilient seal of claim 1, wherein the joints include expansion joints.

21. A method of sealing one or more gaps or joints, the method comprising the steps of:
 (a) providing the resilient seal of claim 1, configured to fill the or each gap or joint;
 (b) aligning the resilient seal with the or each gap or joint; and
 (c) pushing or forcing the resilient seal into the or each gap or joint.

22. The method of claim 21, further comprising an initial step of applying a layer of adhesive onto at least part of the internal surfaces of the one or more gaps or joints.

23. The method of claim 21, wherein the resilient seal is forced into the one or more gaps or joints by utilizing a roller.

\* \* \* \* \*